April 23, 1963
R. E. RUSSELL ETAL
3,086,807
MATERIAL HANDLING EQUIPMENT
Filed Nov. 14, 1958
3 Sheets-Sheet 1
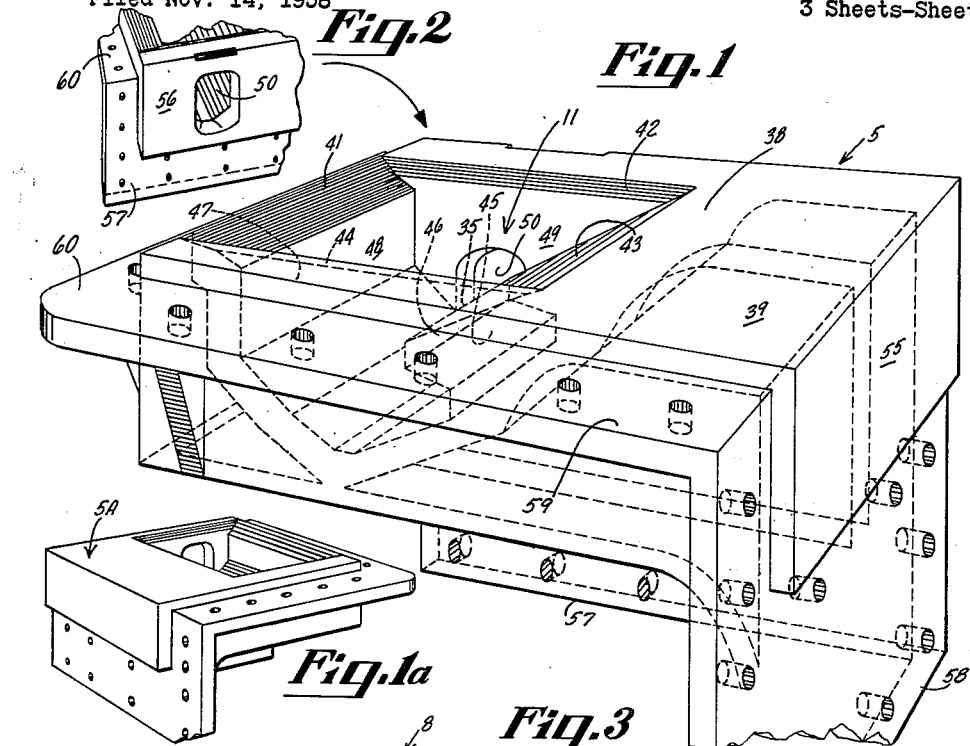
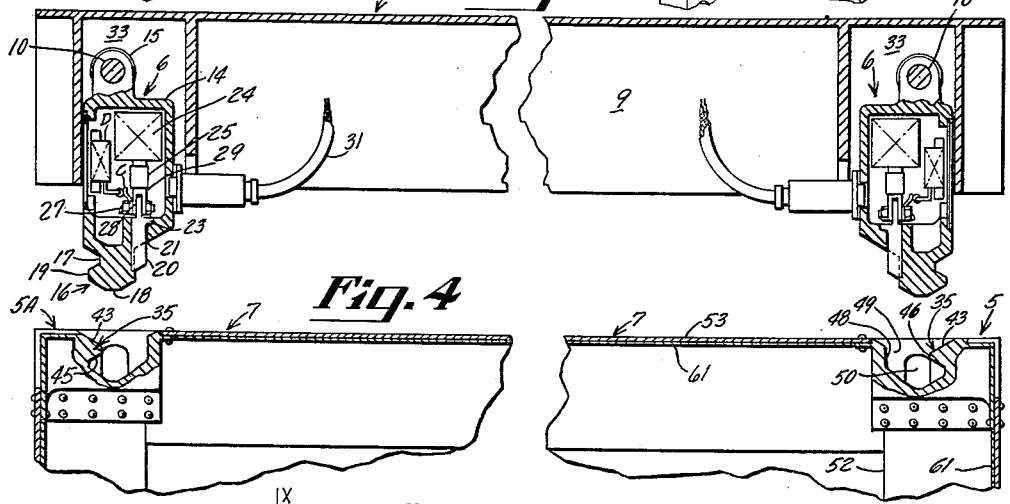
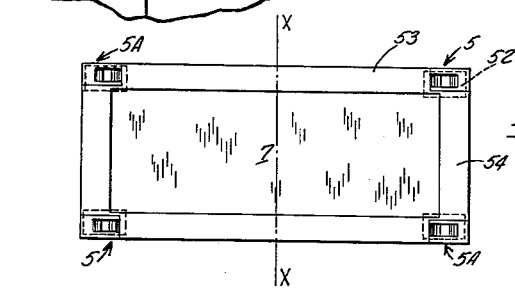
INVENTORS
RICHARD E. RUSSELL
KENNETH L. DEPENTI
DAVID I. WYROUGH
BY Henry Kozak
ATTORNEY April 23, 1963   R. E. RUSSELL ETAL   3,086,807
MATERIAL HANDLING EQUIPMENT
Filed Nov. 14, 1958   3 Sheets-Sheet 2

INVENTOR.
RICHARD E. RUSSELL
KENNETH L. DEPENTI
DAVID J. WYROUGH
BY Henry Kozak
ATTORNEY April 23, 1963  R. E. RUSSELL ETAL  3,086,807
MATERIAL HANDLING EQUIPMENT
Filed Nov. 14, 1958  3 Sheets-Sheet 3

INVENTOR.
RICHARD E. RUSSELL
KENNETH L. DEPENTI
DAVID J. WYROUGH
BY Henry Kozak
ATTORNEY

United States Patent Office 3,086,807
Patented Apr. 23, 1963

3,086,807
MATERIAL HANDLING EQUIPMENT
Richard E. Russell, Hughesville, Pa., and Kenneth L. De Penti, Mayfield Heights, and David J. Wyrough, Maple Heights, Ohio, assignors to National Castings Company, a corporation of Ohio
Filed Nov. 14, 1958, Ser. No. 773,967
17 Claims. (Cl. 294—67)

This invention relates to lifting devices and liftable articles complementally constructed to cooperate in effecting automatic coupling of one with the other. The invention is particularly applicable to freight containers and hoisting apparatus for transferring the containers from carrier to carrier.

Of great interest to the transportation industry is the development of equipment based on standard containers which permit the handling of freight in units of large bulk or weight and are portable by any type of bulk carrier. If such standardization can be attained, then it will be possible for a shipper to place his shipment in one or more containers, send the shipment to a consignee over a route which may require movement of the shipment by a series of carriers, e.g., highway truck, ship, or railway car, without any handling other than the transfer of containers from shipping platform to carrier and vice versa, and from carrier to carrier by standardized lifting equipment. To those familiar with bulk freight handling around ship piers and freight depots, the possibility of substantial savings in labor and in lading damage from handling is obvious.

The prior art includes a number of freight handling systems, each based on a container and a hoist combination. Though some of these systems have been tried commercially, none has attained substantial commercial use, such as to warrant wide-spread adoption as a standard freight-handling facility. In general, the prior art arrangements for coupling the container to a hoist or crane are unsatisfactory because they do not give a hoist operator complete and facile control of the coupling and uncoupling operations. Some systems are burdened by mechanical complexity and therefore prone to faulty operation. Other systems do not provide a hoist mechanism operable within the horizontal cross-section profile of the container and thus do not favor economical use of holdspace in the ship, or other storage space in which containers are closely stacked.

A primary object of this invention is to provide the combination of a lifting device and an article to be lifted thereby, wherein the device and the article are cooperatively self-coupling. It is particularly desirable that pendulously supported lifting devices be utilized in such combination.

Another object is to provide the combination of a lifting device and an article liftable thereby, wherein the cooperating portions thereof which provide automatic coupling action may be disengaged while the article is supported by the device.

It is also an object to provide the combination of a lifting device and an article to be lifted thereby, wherein the cooperating portions providing automatic coupling are of high strength and simplified structure, insuring positive operation.

An object of considerable commercial importance is to provide a hoist-container combination in which the hoist may be automatically and simultaneously attached to the container at a plurality of spaced load-distributing points along the top of the container.

A further object related to the foregoing object is that the hoist-container combination have unusual facility for reaching proper vertical alignment of the hoist with the container.

Another important object in providing an automatically couplable hoist-container combination is that the operation of the hoist require from the operator a minimum of controlling effort and that there be no necessity for an additional attendant in the handling of such containers.

Another object is to provide a hoist-container combination in accordance with the foregoing objects wherein the hoist fits generally within a horizontal cross-section of the container.

In providing such a hoist-container combination, an important object is to devise structural members which may function as hoist-to-container connectors and as container frame connectors contributing to the container unusual strength and durability.

A further object is to provide a container comprising hoist-to-container connectors of a type suitable for use with the hoist embodied in the present invention and adapted also for emergency use with the generally available hook-and-chain hoisting equipment.

Still another object is to provide the container of the invention with sufficient strength to withstand heavy loads such as incurred in stacking such containers. In furtherance of this object, structural members of a container functioning as hoist-to-container connectors may be so constructed as to serve as a bearing or support member for loads placed on top of the container.

In its simplest form, the invention consists of a material handling system comprising a lifting member, such as a hoist, and a liftable member inter-related with the lifting member in structure to provide automatic coupling of the members. In accordance with this invention, the lifting member necessarily has an upwardly-facing inclined surface and the liftable member has a downwardly-facing inclined surface under which the upwardly-facing inclined surface may be fixed to transmit a lifting force from the lifting member to the liftable member. To maintain the members in coupled relationship with the inclined surfaces engaged, locking means is essential to the system for restraining relative lateral movement of the members and includes a lock reciprocably supported by one of the members. The members are separable when the lock is retracted to an unlocking position by a combination of vertical and lateral movement of one member relative to the other in which the inclined surfaces slide over each other in guide relationship out of engaged relationship.

In a preferred embodiment, the plurality of lifting members depend pivotally from a lifting frame and the resulting assembly may be used as a hoist for a container having a plurality of complementary connectors in or associated with its upper surface and arranged in a horizontal pattern similar to that of the lifting members mounted on the frame.

In the drawing with respect to which the invention is described:

FIG. 1 is a perspective view of a "right-hand" liftable pocket member in accordance with a preferred embodiment of the invention;

FIG. 1a is a perspective view of a "left-hand" liftable pocket member similar in type to the member of FIG. 1;

FIG. 2 is a fragmentary corner view of the pocket member of FIG. 1 as seen in the direction of the adjacent arrow;

FIG. 3 is a shortened longitudinal elevation in section of a hoist frame and the projection-type connectors pivotally attached thereto;

FIG. 4 is a fragmentary shortened longitudinal elevation in section of a container incorporating the pocket members of FIGS. 1 and 1a;

FIG. 5 is a plan view of the container shown in FIG. 4;

Figure 6:
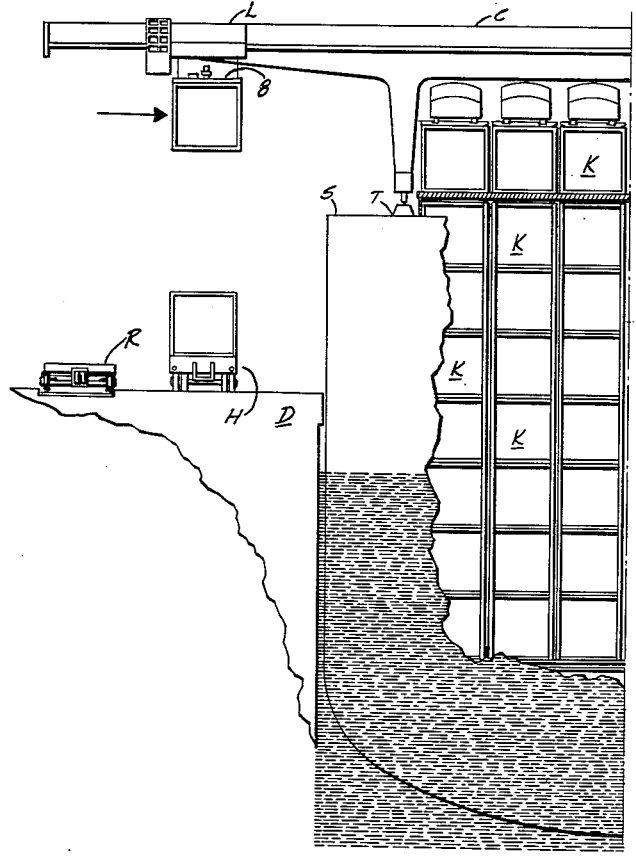
FIG. 6 is a schematic elevation illustrating the use of the invention in freight interchange between water, highway, and railroad carriers.

In a preferred embodiment of the invention, as illustrated in FIGS. 1 to 9, the pocket connector or member 5, shown in detail in FIGS. 1 and 2, is generally representative of any article which may be lifted by the lifting member or connector 6, shown at the right and left of FIG. 3. In the form shown in FIGS. 1 and 2, the pocket member 5 is particularly useful as a structural member of the container 7 shown in FIGS. 4 and 5. The connectors 6 are shown as a part of the hoisting unit 8 of FIG. 3 and are pivotally attached thereto to the frame 9 by means, such as the shafts 10, for lifting the multiple-pocket container 7. However, the connectors are useful individually, for example, when suspended from a hoisting cable to lift any article providing a pocket similar in contour to the pocket 11 of the member 5. It is practical, in some instances, to provide bulk freight articles with such pockets.

Each connector 6 comprises a hollow body portion 14 connected by a bearing extension 15 thereof to a shaft 10. Extending from the lower end of the body portion 14 is a projection 16 comprising a foot portion 18 having a toe 19. The connector further includes a generally vertically reciprocable lock 20 supported against that side of the shank 17 which faces in a direction opposite to that in which the toe 19 protrudes. The lock 20 extends upwardly along the shank through an opening 21 of the connector body 14. Downward travel of the lock 20 is limited by a boss 23 seating on a shoulder of the body 14 formed by a recess or enlargement in the upper portion of the opening 21. The body or housing 14 encloses a solenoid 24 having an armature 25 which raises the lock 20 when energized.

The armature and the lock may be connected as shown by a bolt 27 extending through an upward tongue 28 of the lock and a clevis portion 29 of the armature. De-energizing of the solenoid permits descent of the armature and the lock by gravity until the lock boss 23 reaches its seat in the opening 21. Electrical energy is supplied to the connector through a conduit 31.

As shown, the connectors 6 are housed within separate box compartments of the frame 9. The lateral walls of the compartment 33 are shown in close clearance with the adjacent walls of the connector body 14 for the purpose of limiting the pivotal movements of the connectors. More clearance is provided between those walls of the frame and the connector which are traversed by the cable 31 to allow the toe 19 of the connector to pass around the tongue 35 of the pocket member in effecting either a coupling or uncoupling operation.

Considering now the other of the two major components of the invention, the pocket type connector or member 5 (see FIGS. 1 and 4) has an upwardly facing surface 38 recessed to provide the pocket 11. Because the connector 5 is used as a structural member capable of supporting loads other than those imposed by the contents of the container in which the member is used, surface 38 includes a substantial area in excess of that needed to form a periphery for the pocket 11, as seen at the right of the pocket in FIG. 1. This excess area is provided as a bearing surface 39 to sustain loads when stacking a plurality of containers in which such pocket members are used without overstressing less substantial portions of the top wall of any container in a stack. In order to receive such loads, the surface 38 must protrude above the top "skin" surface of the container.

The periphery of the pocket 11 in the surface 38 is the upper limit for guide surfaces 41, 42, 43, and 44, which incline downwardly or inwardly depthwise toward the center of the pocket. These surfaces are provided for guiding a misaligned projection-type connector into the pocket 11 during a coupling operation. As shown, surfaces 41 and 43 are substantially wider than surfaces 42 and 44.

The tongue 35 of the pocket member is partly formed by the surface 43, a face surface 46, and an undersurface 45. Lateral vertical surfaces 47, 48, and 49 together with the tongue face surface 46 form a shank portion of the pocket 11.

As shown in FIG. 1, the wall 56, providing the surface 49, contains an opening 50 facing exteriorly of the member 5, as shown in FIG. 2. Provision of the opening 50 takes into account that many users of the container 7 will not be equipped with the hoisting unit 8 and will resort to the use of chain and hook. The opening 50 is accordingly provided in all pocket connectors of a container in order that the user may satisfactorily distribute the lifting force as well as undesired lateral forces applied to a container by emergency hoisting equipment.

In one design of a container to which the pocket connector 5 is adapted for use, the connector is positioned in an upper corner of the container as a means for joining an upright angle 52 forming a corner post of the container, a longitudinal corner angle 53, and a transverse corner angle 54. These primary structural or frame members of the container are connected with the connector 5 by being secured to flanges of the connector which are inwardly offset with respect to exterior exposed surface panels 38, 55, and 56. The upright angle 52, for example, is connected with flanges 57 and 58. The transverse angle 54 is connected with flanges 59 and 58. The longitudinal angle 53 is connected with flanges 57 and 60. As shown, the "skin" sheeting 61 of the container is attached primarily to the angle members. In some instances, it is practical to fabricate the container of heavy sheeting without frame members such as angles 52, 53, and 54. In this case, the "skin" sheeting is secured directly to pocket connectors, such as connectors 5 and 5A.

Inspection of FIG. 5 will disclose that, because of the location of the bearing area 39 along one side of the pocket in the top surface of the connector 5, a set of connectors for a single container must be constructed in two pairs of "rights" and "lefts." The "rights" will occur at one pair of diagonal top corners, and the "lefts" will occur at the other pair of top diagonal corners. Assuming the connector 5 illustrated in FIG. 1 is a "right," the connector 5A illustrated in FIG. 1A is a "left," as further shown in FIG. 5.

Figure 8:
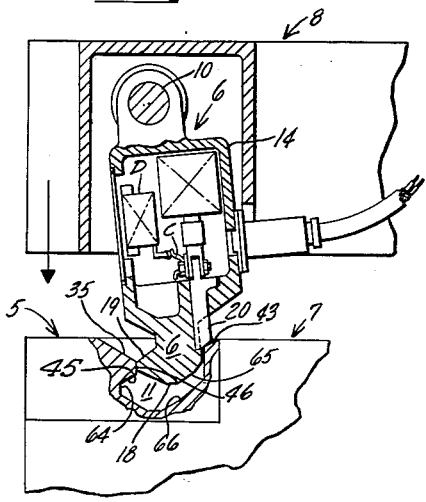
FIG. 8 is a fragmentary elevation in section of the hoisting unit and container of FIGS. 3 and 4 at one instant during a coupling operation.

FIG. 8 superimposes the hoist 8 above the container 7 at an instant in which the projection connector 6 is moving into coupled relation with the pocket connector 5 and the foot 18 of the projection 16 is positioned within the narrowest or shank portion of the pocket 11. As the projection 18 moves into the pocket 11, the lock 20 remains engaged with the sloping surface 43 and consequently is thrust upwardly into the body portion 14 of the connector 6. As the toe 19 of the projection 18 drops below the face surface 46 of the tongue 35 of the pocket connector, the toe is urged into the offset pocket region 64 by engagement of the sloping end surface 65 of the projection with the similarly sloping surface 66 at the bottom of the pocket 11. As shown, the surface 66 slopes downwardly away from the vertical pocket surface 48 into subterposed spaced relation with the upper extremity of the surface 45 forming the upper side of the offset pocket portion. The surface 66 exerts a camming action on the projection of the connector 6 toward the left which terminates with the connector positioned generally as shown in FIG. 9.

Figure 9:
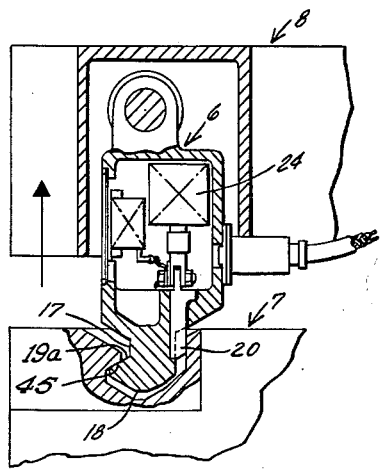
FIG. 9 is a fragmentary elevation in section illustrating the hoisting unit of FIGS. 3, 7, and 8, in a posture for lifting the container of FIGS. 4, 7, and 8.

FIG. 9 shows the generally complementary relationship of the tapered lower end of the projection 16, formed by converging heel and toe surfaces of the foot 18, and the bottom surfaces of the pocket 11. When engaged, the complementary surfaces position the projection within the pocket with the toe 19 substantially occupying the offset pocket portion 64. The surface 66, however, is longer than the opposed foot surface 65 and faces across the pocket toward the tongue 35. FIG. 9 is also typical of the relative positions assumed by the connectors 5 and 6 when the hoist 8 is exerting a lifting force on the container. The lock 20, which slipped inwardly of the pocket 11 during the coupling operation when the toe 19 substantially entered the cavity 64, now firmly engages the lateral vertical surfaces of the pocket opposite its tongue 35, disposing portions of the toe 19 and the tongue 35 in substantially overlapping engaged bearing relationship. Substantially the entire lifting force exerted by the projection connector 6 is transmitted to the tongue 35 through the toe 19, i.e., through engagement of surfaces 19a and 45.

The lock 20 may be retracted to release a suspended load when the solenoid 24 is provided in sufficient power for retracting the lock under load conditions. For this type of operation, the solenoid may be supplanted by other power control means, such as a hydraulic cylinder for operating the lock. However, in the usual manner of operation, it is preferable to rest the container on the surface to which it is being transferred, then lower the hoist 8 slightly to bring about a slack condition between connectors 5 and 6, and then retract the lock before lifting the hoist clear of the container. This practice avoids dropping which might incur damage to the containers and the lading, and reduces the rate of wear in the connectors.

Electrical circuit systems are readily available to the skilled electrician for actuating the locks of all connectors on one hoisting unit simultaneously. Likewise, prior art circuit systems are available for preventing the lifting of the hoist until all locks are in locked position. For this latter purpose, a switch "D," in series with similar switches in other lifting connectors, may be closed by a contact lever "C" carried by the solenoid armature 25.

Figure 7:
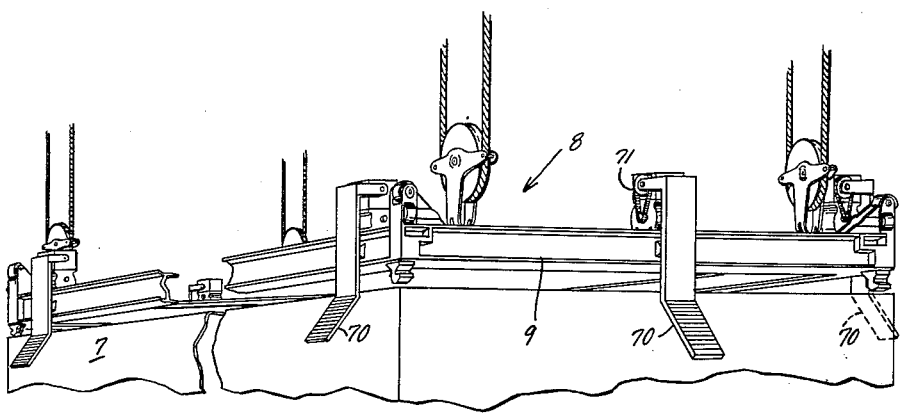
FIG. 7 is a fragmentary shortened perspective view of a multiple-connector hoisting unit in superposed relation with a container especially constructed for use therewith.

FIGS. 6 and 7 illustrate primarily a commercial application of the invention. A ship "S" is provided with a gantry crane "C" running lengthwise of its deck on a track "T." A lifting crane "L" travels on the overhead track provided by the crane C transversely of the ship S and into overhead relation with the dock "D" serving as a loading and unloading area for a highway truck "H" or a railway vehicle "R." The hoist 8 (see FIG. 9) of the crane L, which is raised and lowered by cable and reel mechanism, is thus transferable to a large dock area adjacent the ship and to an extensive region above deck and in the hold of the ship.

The hoist 8 is shown in FIG. 7 equipped with a plurality of guides 70 which may be lowered to the position shown to facilitate the movement of the hoist into proper vertical alignment with a container for effecting coupling. The guides are rotatable by mechanism 71 to an upward position wherein they are disposed laterally inwardly of the frame 9.

To transfer a container from dockside into the ship, the operator of the crane L may, without the assistance of an attendant, bring the hoist 8 into position over a container on either the truck H or railroad car R with the guides 70 lowered in the position shown in FIG. 7, and by simply lowering the hoist, automatically couple it with the container 7. The operator may then lift the container by the crane L and transfer it to a position overhead the ship S for lowering the container into the hold shown occupied by a number of containers K. The crane man may, at any time before the hoist and container enter the hold of the ship, tilt the guides 70 to their inoperative retracted positions above the frame 9 to avoid interference thereof with the internal structure of the ship. Obviously, the ship loading operation just described may be reversed in transferring containers from the ship to the highway truck or railroad car. From this illustration, it is also obvious that transfer of containers between the highway truck and the railroad car may be effected in the same manner.

Figure 10:
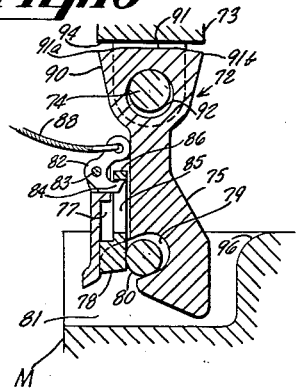
FIG. 10 is a fragmentary elevation of another embodiment of the invention.
Figure 11:
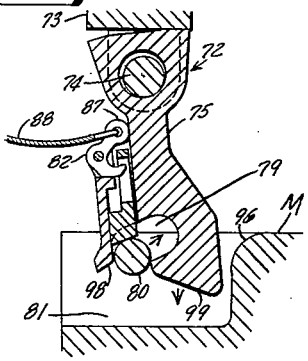
FIG. 11 is a fragmentary elevation in section illustrating the lifting member of FIG. 10 at one instant during a coupling operation.
Figure 12:
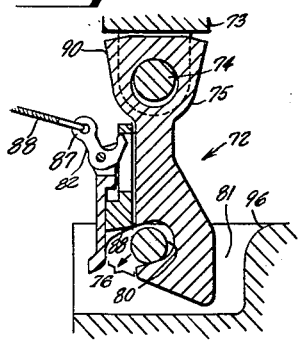
FIG. 12 is a fragmentary elevation in section illustrating the apparatus of FIGS. 10 and 11 with the lifting member adjusted for effecting an uncoupling operation.

FIGS. 10 to 12 illustrate another embodiment of the invention in various positions. A lifting connector 72, associated with a hoist member 73 by a clevis structure comprising an axle or pin element 74 comprises a body 75 and a lock 78. The body 75 has an upper eye portion 90 provided with an opening for receiving the axle 74, and a lower, generally bell-shaped portion, providing a vertically rectiform chamber 77 as an ambit for a vertically reciprocable lock 78 joining with a channelway which extends in a horizontal direction entirely through the body 75 and has a mouth 76 opening downwardly in the undersurface of the body. The channelway has a horizontally elongate chamber 79 in horizontally offset relation with the mouth 76. The top and bottom surfaces of the chamber 79 are canted upwardly in a direction away from the chamber 77 and joined by a rounded lateral surface to accommodate a bridge element 80 secured to the side walls of a recess 81 of a container 7 or other article to be lifted. The sloping lower surface of the chamber 79 permits the element 80 to slide downwardly out of the chamber when the lock 78 is retracted upwardly as in uncoupling operations.

The connector 72 also includes a bell-crank lever 82 supported by the body 75 on a pivot pin 83. One end portion 84 of the lever 72 extends into an opening 85 in the shank of the lock 78. As illustrated in FIG. 10, the lever 82 functions as a lower stop for the lock 78 when a closed-end portion 86 of the lock rests on the end-portion 84 of the lever. The eye portion 87 of the bell-crank is attached to an operating cable 88 leading to an operating station for the hoisting system. As shown in FIGS. 10 and 11, the cable is relaxed.

The upper eye portion 90 of the body 75 has an opening 92 to receive the element 74. The eye portion 90 also has a flat upper surface 91 of greater width than the diameter of the opening 92. The clearance between the surface 91 and an opposing downwardly-facing surface 94 of the hoist 73 is not greater and preferably less than the difference in the diameters of the opening 92 and the axle 74 extending therethrough. This arrangement is desirable so that the surface 91 will engage the surface 94 in coupling operations and hold the lifting connector 72 from angling (beyond the range permitted by contact of the corners 91a and 91b with the surface 94) to inoperative positions wherein coupling is prevented. Such an arrangement, on the other hand, does not prevent preliminary angling of the connector 72 in preliminary "gathering" or self-alignment movements of the lifting and liftable members as they initially come into engagement.

Upper corner surfaces of the recess 81, such as corner surface 86, are rounded to implement coupling. The undersurfaces 98 and 99 of the connector 72 taper upwardly toward the opening to chamber 79 to provide the primary "gathering" facility for bringing the connector 72 into proper coupling alignment with the element 80. The corners 91a and 91b of the surface 91 not only limit the range in which the connector 72 may angle with respect to the hoist 73 but they are effective in establishing a fixed alignment of the hoist and the connector as the surface 94, in being urged by the weight of the hoist 33, settles onto the surface 91 in the relationship shown in FIG. 11. In this relative position, the hoist and the connector 72 are, to some extent, rigidly aligned and able to exert the full effect of their combined weights in forcing the upward movement of the lock 78 and movement of the connector to a position wherein the element 80 occupies the chamber 79.

FIG. 11 is illustrative of the coupling operation wherein the hoist 73 and the connector 7 are engaged at surfaces 91 and 94 and are moving together downwardly to attain coupled relation with the element 80. The corner 91b is at this instant limiting further angling of the connector relative to the hoist. The element 80 is engaged with the lower surface of the lock 78 and is moving it upwardly within the chamber 77. As shown, the lock has lost contact with the lever tip 84.

FIG. 12 illustrates the connector 72 in a condition for being uncoupled from the liftable article M. The cable 88 is shown taut with the lever 82 rotated to a position imparting the full lift to the lock 88. The connector 72 is hanging freely on the staple element 74. All that is necessary to complete the uncoupling operation is to elevate the hoist and connector assembly to displace the element 80 from the chamber 79 of the connector.

FIGS. 13 to 16 represent different embodiments, each incorporating a set of common elements of the invention diagrammatically illustrated therein but rearranged in the different figures within the scope of the invention.

Figure 13:
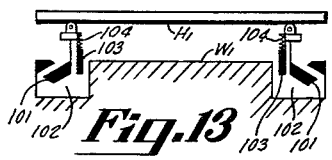
FIG. 13 is a diagrammatic elevation of the embodiment illustrated in FIGS. 1 to 8.
Figure 14:
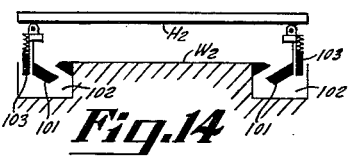
FIG. 14 is a diagrammatic elevation of a modified embodiment.

In these four figures, three basic structural elements, viz: projection 101, pocket 102, and lock 103 are rearranged relative to a hoist H and an article W to be lifted. FIGS. 13 and 14 illustrate arrangements wherein the projection and the lock are associated with the hoist H. The pocket 102 is associated with the article W to be lifted. In both of these cases the pocket provides the downwardly-facing surface of the liftable article which interlocks with the upwardly-facing surface provided by the projection of the hoist. The embodiments of FIGS. 13 and 14 differ in that the projections 101 of hoist $H_1$ in FIG. 13 point away from each other disposing the locks 103 toward each other, whereas in FIG. 14 the projections point toward each other and the locks 103 are disposed away from each other. Springs 104 may be provided for urging the locks toward the pockets. The pockets of the article ($W_1$ or $W_2$) in each case are oriented accordingly. The arrangement illustrated by FIG. 3 corresponds in principle to that described with respect to FIGS. 1 to 9.

Figure 15:
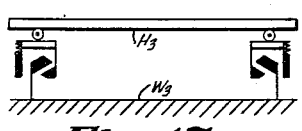
FIG. 15 is a diagrammatic elevation of another embodiment.
Figure 16:
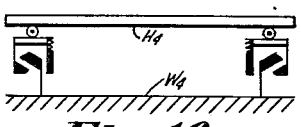
FIG. 16 is a diagrammatic elevation of still another embodiment.
Figure 12A:
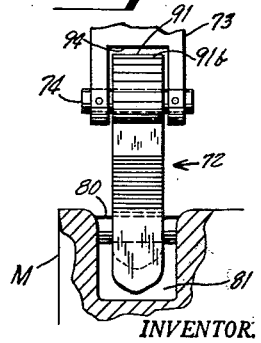
FIG. 12a is a fragmentary elevation partially in section of the lifting system of FIGS. 10 to 12, as viewed from the right in FIGS. 10 to 12.

The arrangements of FIGS. 15 and 16 differ from those illustrated in FIGS. 13 and 14 by the disposition of both the pocket and the lock in the connectors of the hoist ($H_3$ or $H_4$), whereas in FIGS. 13 and 14 the lock is in the hoist and the pocket is in the article. The projection of FIGS. 15 and 16 is associated with the article ($W_3$ or $W_4$) to be lifted. For the sake of illustration, the projections associated with the article to be lifted have been raised above the top surface thereof. In a practical situation, such projections would be recessed in a pocket of the article, and the connectors of the hoist, though they provide a pocket, would be constructed to enter the pockets of the article.

FIGS. 15 and 16 differ from each other by having the projections of FIG. 15 point toward each other whereas in FIG. 16 they point away from each other. The pockets and the locks of the connectors associated with the hoists are correspondingly oriented. In all of the embodiments shown, involving a plurality of lifting connectors and corresponding liftable connectors, the connectors are arranged in a horizontal pattern with the same corresponding lateral face of, for example, the lifting connectors facing toward a horizontal axis bisecting the pattern. For example, see the axis X—X of FIG. 5.

In the two earlier embodiments more fully described, both manual and power operation of the locks have been disclosed. The skilled mechanic may, of course, resort to many other combinations of manual and power mechanism for lock operation, including, for example, hydraulic, pneumatic, and motor-operated mechanisms involving more or less manual assistance.

The invention disclosed in the foregoing description makes available a commercially practical container and container-handling system adapted for use with all types of freight transfer equipment. Because of the automatic coupling feature of the invention equipment in accordance therewith is operable with less labor cost, with greater work output, and with less effort and skill by, for example, a crane operator, than equipment heretofore available. The provision of the multiple-purpose pocket connector of the container makes possible the production of an extremely durable container adapted for stacking, yet adapted for rapid handling by the hoist equipment included in this invention. As the design of the pocket connector is suited to mass production metal casting practice, the container may be constructed, as taught by the invention, without substantial additional cost. The hoist or lifting connectors are also suited for manufacture by metal casting techniques.

The terms and expressions which have been employed are used as terms of description and not of limitation and there is no intention of excluding such equivalents of the invention described or of the portions thereof as fall within the purview of the claims.

What is claimed is:

1. A pocket-type connector for use as a freight container component comprising, with respect to a position assumed for normal operation; a top wall providing the periphery of the upper entrance for a pocket; and walls extending downwardly from the top wall defining the interior surfaces of the pocket; the pocket having an upper shank portion, a lower portion adjacent the lower end of the shank portion in laterally offset contiguous relation therewith, and a guide surface disposed along the side of the pocket opposite its offset portion inclined downwardly away from the side of the shank portion opposite said offset portion into spaced subterposed relation with the upper extremity of the upper side of the offset portion adapting the connector for guiding a portion of a lifting means entering said pocket into the offset portion; the upper side of said lower pocket portion being defined by a bearing surface inclining downwardly away from the shank portion.

2. The pocket-type connector of claim 1, comprising: exterior lateral walls intersecting said top wall at a common corner of the connector; said intersecting walls terminating away from said corner in flanges adapted for attaching the connector to wall-forming members of a container.

3. The pocket-type connector of claim 1, comprising: an exterior lateral wall adapted for facing exteriorly of a container and defining a side of said shank portion and said offset portion of the pocket; said lateral wall having an aperture contiguous with said shank portion for receiving a hoisting hook.

4. A pocket-type connector for use as a freight container component comprising, with respect to a position assumed for normal operation: a top wall providing the periphery of the upper entrance of a pocket extending downwardly within the connector from the top wall; and lateral walls extending downwardly from the top wall to generally define said pocket; said lateral walls disposed to form said pocket into an upper shank portion and a portion in offset contiguous relation with the lower end of the shank portion; said pocket having an inclined guide surface adjacent the lower end of the shank portion extending downwardly from the side of the shank portion opposite the offset portion into subterposed spaced relation with the upper extremity of the upper side of the offset portion for guiding a lifting means entering said pocket into said offset portion; the upper side of said lower pocket portion being defined by a bearing surface inclining downwardly away from the shank portion; exterior lateral walls joining said top wall in a corner and terminating away from said corner in flanges adapting the connector for attachment to wall-forming members of a container.

5. The pocket-type connector of claim 3 wherein: said top wall is extended horizontally from said periphery to provide an upwardly-facing load-receiving area.

6. The pocket-type connector of claim 4 wherein: said offset pocket portion is formed by an overhanging tongue disposed along one side of the shank portion and extending between opposite lateral walls of the connector; one of said lateral walls having an opening through the portion thereof partially defining said shank portion for receiving a hoist hook.

7. A cargo container handling apparatus comprising: a lifting frame adapted for a centered position superjacent a cargo container; and a plurality of lifting connectors for automatically connecting the frame with the container; each connector comprising a lower projection providing a shank and a toe tapering in a lateral direction from the lower end of the shank, a body portion disposed in upward fixed relation with the projection and connected pivotally with the frame along a generally horizontal axis in spaced crosswise relation with said lateral direction, and a lock supported within the connector and along one side of the shank opposite that from which the toe projects; said lock being reciprocable relative to the projection in the vertical lengthwise direction of the shank.

8. A cargo handling apparatus comprising: a lifting frame adapted for a centered position superjacent a cargo container; and a plurality of lifting connectors for automatically connecting the frame with the container; each connector comprising a lower projection providing a shank and a toe tapering in a lateral direction from the lower end of the shank, a body portion disposed in upward fixed relation with the projection and connected pivotally with the frame along a generally horizontal axis in spaced crosswise relation with said lateral direction and a lock supported within the connector and along one side of the shank opposite that from which the toe projects; said lock being reciprocable relative to the projection in the vertical lengthwise direction of the shank; a container having pockets opening in the top surface of the container and arranged in a horizontal and vertical pattern similar to that of said connectors thereby adapting the pockets to receive the connectors simultaneously; each pocket having a shank portion extending downwardly from said top surface to merge with an inward pocket portion of which the upper side inclines away from the shank in a downward lateral direction, said pocket portion being disposed with respect to the shank portion to receive the toe of the respective connector received by said pocket with substantially the upper side of the toe in contact with the upper side of said pocket portion; said shank portion of each pocket being of a width relative to the overall width of the projection permitting insertion into, and withdrawal from, the pocket of a mating connector when the lock is retracted upwardly out of engagement with the container, and permitting entry of the lock between the connector shank and the wall of the shank portion only when the toe is positioned to a substantial extent within the offset pocket portion.

9. A cargo container handling apparatus comprising: a lifting frame having a generally planar undersurface; a plurality of lifting connectors extending pendulously to a level below said undersurface; each connector comprising an upper body portion connected pivotally with the frame along a generally horizontal axis, a lower projection disposed below the frame in fixed downward relation with the body portion and providing a shank of downward extending length, and a toe tapering in a lateral direction from the lower end of the shank in crosswise relation with said axis, a lock supported within the body portion and along the side of the shank opposite to that from which the toe projects, the lock being in guide relation with the body portion and shank for reciprocation lengthwise of the shank; and a container having pockets opening at approximately the same plane in the top surface of the container in a horizontal and vertical pattern providing a pocket for each connector and simultaneous entry of the connectors into the pockets, each pocket having a shank portion extending downward from said top surface, and a horizontally offset inward pocket portion tapering laterally away from the shank portion and disposed with respect thereto for receiving the toe of the respective connector received by said pocket with substantially the upper side of the toe in contact with the upper side of said pocket portion; said shank portion of each pocket being of a width relative to the overall width of the projection permitting insertion into, and withdrawal from, the pocket of a mating connector when the lock is retracted upwardly out of engagement with the container, and permitting entry of the lock between the connector shank and the wall of the shank only when the toe is positioned to a substantial extent within the offset pocket portion.

10. The apparatus of claim 9 wherein: the connectors are supported at parallel pivotal axes and in a horizontal pattern that is symmetrical with respect to an axis which is parallel to said pivotal axes and bisects the pattern; all of said connectors having the same corresponding lateral side facing toward said axis; said pockets being correspondingly arranged to allow reversible end-for-end application of the frame and connector assembly to the container.

11. The apparatus of claim 9 wherein: said container is of rectangular box-shaped construction and comprises wall-forming members and pocket type connectors for joining the wall-forming members, each pocket type connector providing one of said pockets and being secured in an upper corner of the container to adjacent wall-forming members with the pocket exposed in the upper surface of the container.

12. The apparatus of claim 9 wherein: said container is of rectangular box-shaped construction and comprises wall-forming members including primary frame sections and pocket type connectors for joining the frame sections, each pocket type connector providing one of said pockets and being secured in an upper corner to frame members meeting at said corner to form a joint of the frame, said pocket type connector having exposed in the upper surface of the container the opening of its pocket and a horizontal wall portion to one side of the opening having its upper surface at least as high as the periphery of the opening.

13. The apparatus of claim 9 comprising: a supporting means for the lifting member having a flat undersurface and a downward extension forming a pivotal connection along a horizontal axis spaced downwardly from the undersurface; the lifting member having a flat upwardly-facing top surface in opposing relation with said undersurface with a desired clearance developed therebetween when the lifting member hangs pendulously from the supporting means; said pivotal connection providing slack movement of the lifting member relative to the supporting means greater than said clearance.

14. The apparatus of claim 11 wherein: each of the pocket type connectors comprises a tongue overhanging and forming the offset pocket portion and the face of the tongue extends between opposite side walls of the pocket; one of said side walls being exposed in a lateral surface of the container and having an opening therethrough for receiving a hoist hook.

15. The apparatus of claim 11 wherein: each pocket type connector has a body comprising walls for forming the pocket including a top wall providing an opening to the pocket and a bearing surface one side of, and at least as high as, the periphery of said opening; the pocket type connector having a terminal corner providing the extreme corner of the container and formed at the junction of two side walls and said top wall of said body; each of said three connector walls being extended beyond the body toward other corners of the container to provide flanges; and including means for connecting the flanges to said wall-forming members.

16. A freight container adapted for automatic coupling with a lifting means and comprising: a normally upwardly-facing load-receiving wall having a pocket for receiving said lifting means; the pocket having, named as follows in the order of increasing depth, an opening in the upper face of said wall, a downwardly-extending shank portion, and a portion laterally offset with respect to said shank portion, the upper side of said offset portion being defined by a bearing surface inclining downwardly away from the shank portion; the pocket having an upwardly-facing guide surface sloping downwardly away from a vertical surface of the pocket opposite said offset portion and extending into spaced subterposed relationship with the upper extremity of said upper side of said offset portion; said guide surface providing camming of a lifting means engaging therewith into said offset portion.

17. A freight container adapted for automatic coupling with a lifting means and comprising: wall-forming members including primary frame sections and pocket-type connectors joined to the frame sections, each connector providing a pocket for receiving a lifting means and being secured between adjacent ends of two or more frame sections to unite the frame into a joint in the top wall of the container with the opening of the pocket exposed in an upwardly-facing load-receiving surface of the container; the pocket having, named as follows in the order of increasing depths from the opening, a downwardly-extending shank portion, and a portion entirely offset with respect to the shank portion, the upper side of said offset portion being defined by a generally flat bearing surface inclining downwardly away from the shank portion; the bottom surface of the pocket being formed partly by a guide surface sloping downwardly from a vertical side surface of the pocket opposite said offset portion into spaced subterposed relation with the upper extremity of said upper side of the offset portion; said guide surface engageable by a lifting means to provide camming of a lifting means into said offset portion.

References Cited in the file of this patent

UNITED STATES PATENTS

| | | |
|---|---|---|
| 1,727,685 | Willoughby | Sept. 10, 1929 |
| 1,744,824 | Collison | Jan. 28, 1930 |
| 1,760,305 | Fildes | May 27, 1930 |
| 1,866,350 | Holden | July 5, 1932 |
| 2,119,547 | Knerr | June 7, 1938 |
| 2,547,502 | Smith | Apr. 3, 1951 |
| 2,555,297 | Smith et al. | May 29, 1951 |
| 2,660,319 | Dorland | Nov. 24, 1953 |
| 2,730,687 | Modrey | Jan. 10, 1956 |
| 2,836,444 | Arnold | May 27, 1958 |
| 2,847,245 | Leslie | Aug. 12, 1958 |
| 2,904,370 | Meinholtz | Sept. 5, 1959 |
| 2,948,383 | Modrey | Aug. 9, 1960 |